United States Patent
Peng et al.

(10) Patent No.: US 10,230,322 B2
(45) Date of Patent: Mar. 12, 2019

(54) SMART MOTOR DRIVER ARCHITECTURE WITH BUILT-IN MEMS SENSOR BASED EARLY DIAGNOSIS OF FAULTS

(71) Applicant: STMicroelectronics, Inc., Coppell, TX (US)

(72) Inventors: Cheng Peng, Plano, TX (US); Robert Krysiak, Burlington, MA (US)

(73) Assignee: STMicroelectronics, Inc., Coppell, TX (US)

( * ) Notice: Subject to any disclaimer, the term of this patent is extended or adjusted under 35 U.S.C. 154(b) by 9 days.

(21) Appl. No.: 15/428,847

(22) Filed: Feb. 9, 2017

(65) Prior Publication Data

US 2018/0167016 A1 Jun. 14, 2018

Related U.S. Application Data

(60) Provisional application No. 62/433,108, filed on Dec. 12, 2016.

(51) Int. Cl.
*H02P 29/60* (2016.01)
*H02P 27/08* (2006.01)

(52) U.S. Cl.
CPC ............. *H02P 29/60* (2016.02); *H02P 27/08* (2013.01)

(58) Field of Classification Search
CPC ........................................ H02P 29/60
USPC .......................... 318/449, 445, 34
See application file for complete search history.

(56) References Cited

U.S. PATENT DOCUMENTS

| | | | |
|---|---|---|---|
| 7,308,322 B1 * | 12/2007 | Discenzo | G05B 23/0221 700/175 |
| 9,831,814 B2 * | 11/2017 | Ajima | H02P 27/08 |
| 2010/0169030 A1 * | 7/2010 | Parlos | G01H 1/00 702/58 |
| 2016/0231192 A1 | 8/2016 | Hammerschmidt | |

OTHER PUBLICATIONS

UM1052 User Manual; STM32F PMSM single/dual FOC SDK v 4.3; Sep. 2016.

* cited by examiner

*Primary Examiner* — David S Luo
(74) *Attorney, Agent, or Firm* — Crowe & Dunlevy (57) ABSTRACT

A system in package encloses a sensor and motor driver circuit. In an implementation, the sensor is an integrated circuit micro-electro-mechanical-systems (MEMS) sensor and the driver circuit is a motor driver circuit. Non-motor winding data information is sensed by the MEMS sensor and processed for the purpose of characterizing known fault patterns for motors; characterizing normal operation of the motor; and evaluating continued operation of the motor to detect abnormal motor behavior and instances of motor fault. The motor is driven using PWM control and the information output by the MEMS sensor is sampled at sampling times having a fixed timing relationship relative to the PWM control signals.

31 Claims, 9 Drawing Sheets

SMART MOTOR DRIVER ARCHITECTURE WITH BUILT-IN MEMS SENSOR BASED EARLY DIAGNOSIS OF FAULTS

CROSS-REFERENCE TO RELATED APPLICATIONS

This application claims priority from United States Provisional Application for Patent No. 62/433,108 filed Dec. 12, 2016, the disclosure of which is incorporated by reference.

TECHNICAL FIELD

The present invention relates to fault diagnosis and, in particular, to the use of data provided by one or more micro-electro-mechanical-systems (MEMS) sensors in response to the operation of motor driver circuitry for early diagnosis of motor faults.

BACKGROUND

More and more electrical motors have been utilized in home appliances, automotive and industry automation. There is an advantage to the provision of a seamless fusion of motor and sensor technology together. Sudden motor failures such as stator winding short-circuit and bearing damage can be catastrophic in many application scenarios. Early diagnosis of various kinds of motor faults is critical.

Compared with off-line diagnosis, on-line real-time diagnosis of rotating motors has more advantages including operation cost saving and early detection to avoid catastrophic results. Due to multiple types of motor faults and complexity, a unified monitoring and diagnostic approach based on multiple sensor inputs achieves much better performance than single source (e.g., current sensing or voltage sensing) approach. Various kinds of sensing techniques (vibration, pressure, temperature and sounds) relating to non-motor winding data are essential for motor fault early diagnosis.

SUMMARY

In an embodiment, a system in package (SiP) comprises: at least one integrated circuit die implementing a micro-electro-mechanical-systems (MEMS) sensor; a least one integrated circuit die implementing a control circuit for a motor; a support substrate having a top surface and a bottom surface, with first pads on the top surface and second pads on the bottom surface, the first and second pads interconnected by interconnect wiring; wherein the at least one integrated circuit die implementing the MEMS sensor is mounted to the top surface and electrically connected to ones of said first pads; wherein the at least one integrated circuit die implementing the control circuit for the motor body is also mounted to the top surface and electrically connected to ones of said first pads; and an encapsulant body which encapsulates the at least one integrated circuit die implementing the MEMS sensor and the at least one integrated circuit die implementing the control circuit for the motor.

In an embodiment, a system comprises: a micro-electro-mechanical-systems (MEMS) sensor; and a control circuit for a motor; wherein the MEMS sensor includes a sample and hold circuit, and wherein the sample and hold circuit is configured to perform a sampling operation in response to a control signal, and wherein said control signal is generated by the control circuit with a fixed timing relationship relative to the PWM control signals.

In an embodiment, a method comprises: operating a plurality of motors having different known fault patterns over a range of motor operating speeds; sensing non-motor winding data information relating to each of the plurality of motors using one or more micro-electro-mechanical-systems (MEMS) sensors; and processing the non-motor winding data information to generate a library of non-motor winding data information correlated to the known fault patterns.

The method further comprises: operating an application motor without having a fault pattern over a range of motor operating speeds; sensing non-motor winding data information relating to the application motor using said one or more MEMS sensors; and processing the non-motor winding data information to generate a library of non-motor winding data information correlated to non-fault motor operation.

The method further comprises: operating the application motor over time; sensing non-motor winding data information relating to the application motor using said one or more MEMS sensors; comparing the sensed non-motor winding data information to the library of non-motor winding data information correlated to non-fault motor operation; and if there is a match between the sensed non-motor winding data information to the library of non-motor winding data information correlated to non-fault motor operation, then continuing operation of the application motor.

The method also comprises: if there is not a match between the sensed non-motor winding data information to the library of non-motor winding data information correlated to non-fault motor operation, then comparing the sensed non-motor winding data information to the library of non-motor winding data information correlated to the known fault patterns; and if there is a match between the sensed non-motor winding data information to the library of non-motor winding data information correlated to the known fault patterns, then issue a fault warning for the known fault pattern that matches.

The method also comprises: if there is not a match between the sensed non-motor winding data information to the library of non-motor winding data information correlated to non-fault motor operation, then issue a warning as to possible motor fault.

In the method, operating the motor comprises: generating pulse width modulation (PWM) control signals for application to the motor; and sampling the non-motor winding data information generated by the MEMS sensors at sample times that have a fixed timing relationship relative to the PWM control signals.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
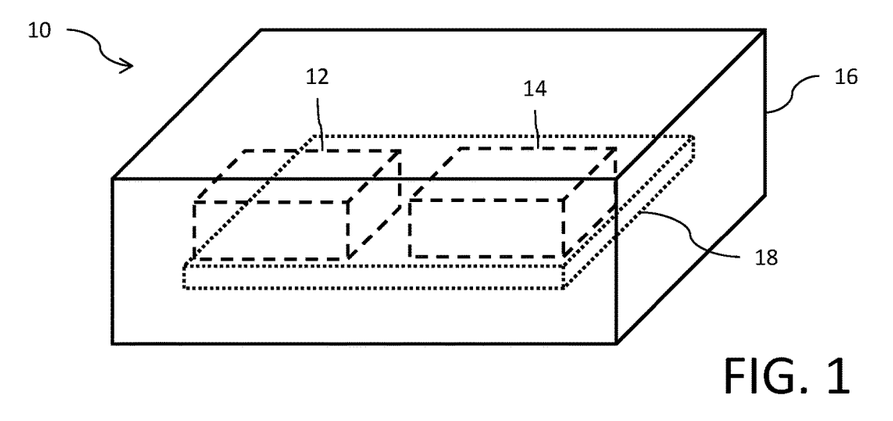
FIGS. 1 and 2 show a system in package implementation wherein one or more micro-electro-mechanical-systems (MEMS) sensors and motor driver circuitry are provided within a common package.
Figure 2:
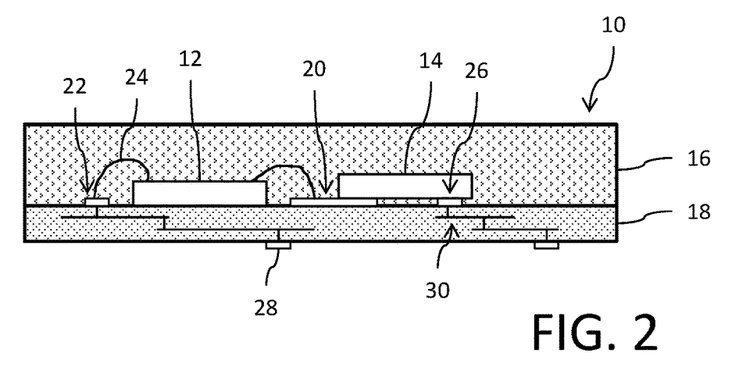

Reference is now made to FIGS. 1 and 2 showing a system in package 10 implementation wherein one or more micro-electro-mechanical-systems (MEMS) sensors 12 and motor driver circuitry 14 are provided within a common package 16. The integrated circuit die for the MEMS sensor 12 and the integrated circuit die for the driver circuitry 14 are mounted to a common support 18 which may provide interconnection wiring 20 for electrically interconnecting the MEMS sensor 12 and driver circuitry 14. The common package 16 may, for example, comprise a molded encapsulant body which encapsulates the integrated circuit dies for the MEMS sensor 12 and driver circuitry 14 as well as the common support 18. The interconnect pads of the integrated circuit die for the MEMS sensor 12 may be electrically connected to pads 22 of the common support 18 using bonding wires 24 or alternatively through a direct soldered connection 26 in a flip-chip configuration. The interconnect pads of the integrated circuit die for the driver circuitry 14 may likewise be electrically connected to pads of the common support 18 using bonding wires or alternatively through a direct soldered connection in a flip-chip configuration. The common support 18 includes the die connection pads 22 on a top surface, external connection pads 28 (for example arranged in a ball grid array (BGA) configuration) on a bottom surface, and a multi-layer interconnect wiring configuration 30 to interconnect the pads on the top surface with the pads on the bottom surface.

The system in package 10 implements, for example, an application for a smart fan motor driver architecture with MEMS-sensor-based early diagnosis built-in. This solution provides an ideal all-in-one solution that enables on-line real-time condition monitoring and diagnosis. The MEMS sensors 12 have great advantage due to compact size, low power consumption and superior accuracy and noise immunity. The system in package 10 technology seamlessly encloses the integrated circuit die for the motor driver (with control block) 14 with the integrated circuit die for the one or more MEMS sensors 12 in a compact package. As an advantage, the resulting product can operate with a reduced power consumption in comparison to a solution using discrete integrated circuits. This integrated circuit system architecture can accelerate market adoption of on-line early diagnosis thanks to low power consumption, compact package size, easy calibration, improved noise immunity, system complicity and PCB footprint reduction.

Figure 3:
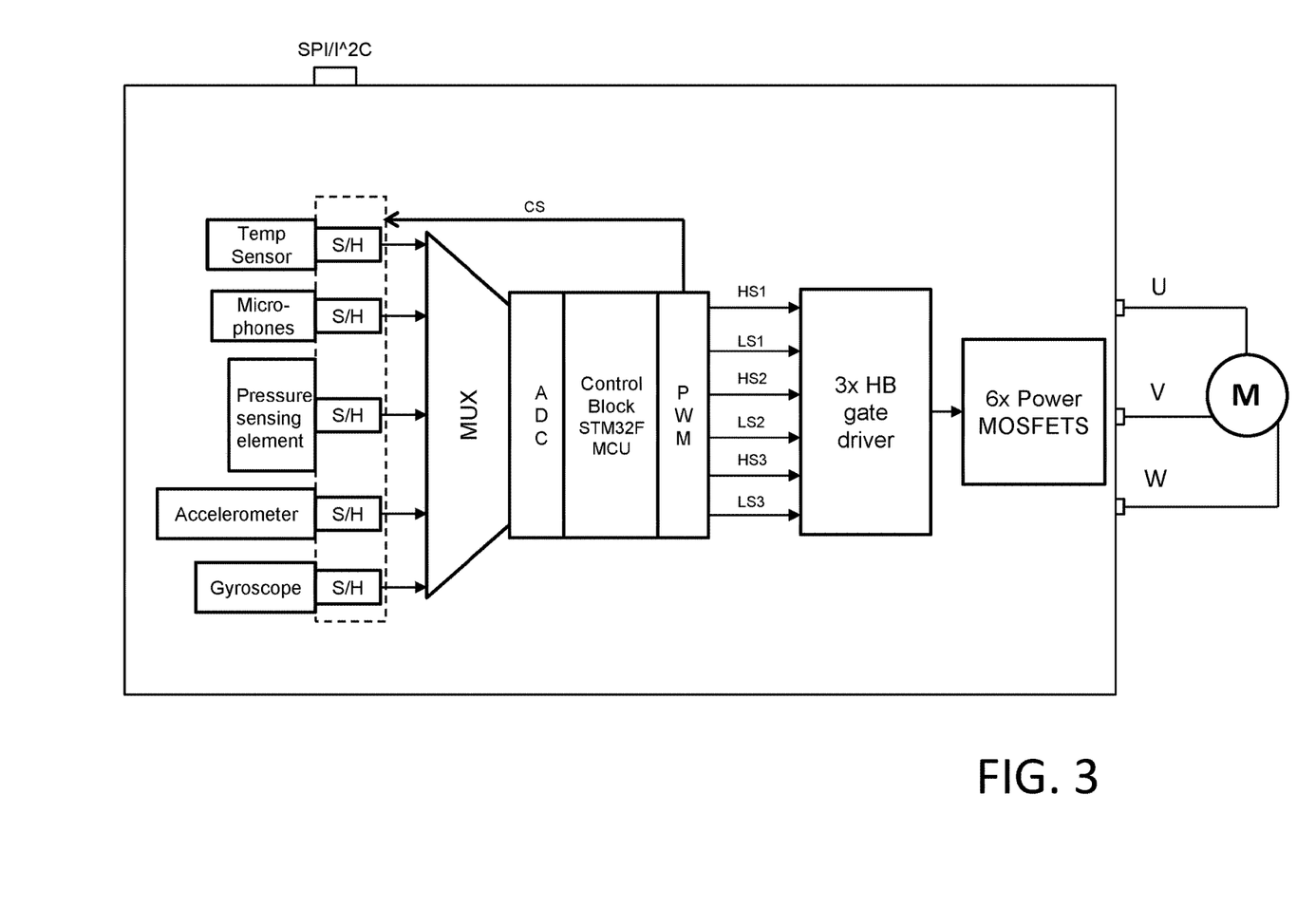
FIG. 3 is a block diagram of the system for a fan motor application.

Reference is now made to FIG. 3 showing a block diagram of the system. The system includes a plurality of MEMS sensors (including, for example, a temperature sensor, a microphone, a pressure sensor, an accelerometer, and a gyroscope) for sensing non-motor winding data. In this context, "non-motor winding data" means non-electrical motor data (i.e., data other the current and/or voltage data relating to the motor windings). The MEMS sensors may be implemented in a common integrated circuit die or provided on two or more integrated circuit dice. Each MEMS sensor includes a sample and hold (S/H) circuit configured to sample the information output from the MEMS sensor in response to a sample and hold control signal CS, with the sampled information then held for subsequent selection and reading. A multiplexer (MUX) is controlled to select the held information from one of the MEMS sensors to input to an analog to digital converter (ADC). In this implementation, the sampled and held information from the MEMS sensor comprises analog signal information. The ADC converts the analog signal information from the MEMS sensors to corresponding digital signal information that is processed by a control block (for example, implemented as a microcontroller such as an STM32F MCU). The control block processes the non-motor winding information from the sensors, along with external information supplied through an input/output port (such as an I²C interface), as well as motor winding data such as motor winding current/voltage measurements, to generate pulse width modulated (PWM) control signals. The PWM control signals are applied to half-bridge (HB) driver circuits which drive power MOSFETS associated with each phase winding (U, V, W) of the motor in a three-phase implementation.

In an embodiment, the signal handling, processing and driving circuitry may be based, for example, on the STSPIN family of circuits (for example, STSPIN220, STSPIN230, STSPIN240 and STSPIN250 drivers). In an embodiment, the MEMS sensor circuitry may be based, for example, on the STMicroelectronics MEMS sensors (for example, LPS25HB pressure sensor; HTS221 humidity and temperature sensor; LSM6DSL or LSM6DSM 6-axis accerometer and gyroscope; TS4621 stereo amplifier). The integrated circuits for the given application are assembled together in a System in Package (SiP) format.

In an embodiment, the common package 16 of the SiP implementation may be mounted on or near the housing for the motor. This is advantageous with respect to use of the MEMS sensors for the purpose of collecting non-motor winding data information.

Figure 4:
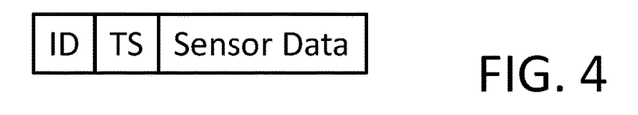
FIG. 4 illustrates a data format for MEMS sensor information.

FIG. 4 illustrates a data format for the digital signal information processed by the control block. The data format includes a first data field (ID) that provides information identifying the particular MEMS sensor from which the sensor information is obtained. The data format further includes a second data field (TS) that provides information in the form of a time stamp identifying the relative time at which the sensor information was sampled by the sample and hold (S/H) circuit in response to the control signal CS. The data format further includes a third data field (Sensor Data) that provides the digital signal information obtained from the analog to digital conversion of the MEMS sensor output information.

Figure 5:
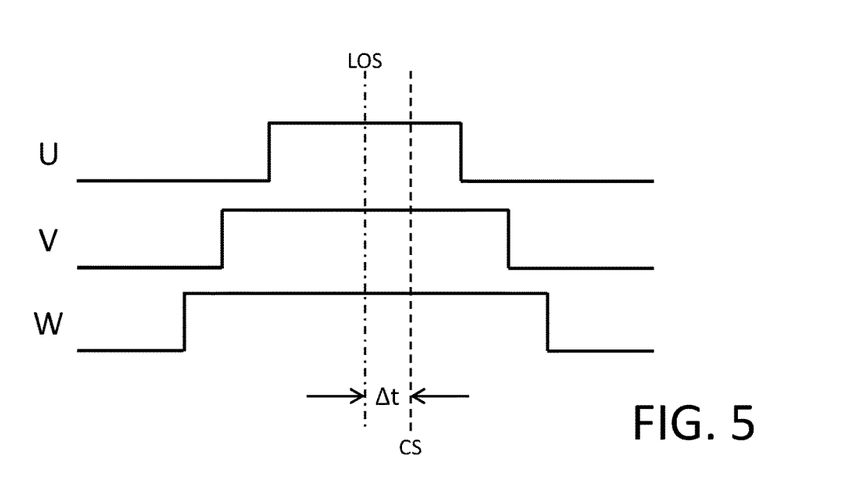
FIGS. 5 and 6 show the timing relationship between the PWM control signaling and the sample and hold control signaling.

The PWM control signals are generated using a conventional field oriented control (FOC) algorithm. FIG. 5 shows an example relationship of the PWM control signals for the U, V, and W phases of the motor. As known in the art, the PWM control signals include pulses that are centered on a pulse line of symmetry (LOS) with one half of each pulse on opposite sides of the line of symmetry and a duration of each pulse being controlled by the FOC algorithm to effectuate a certain drive of the motor (M).

Figure 6:
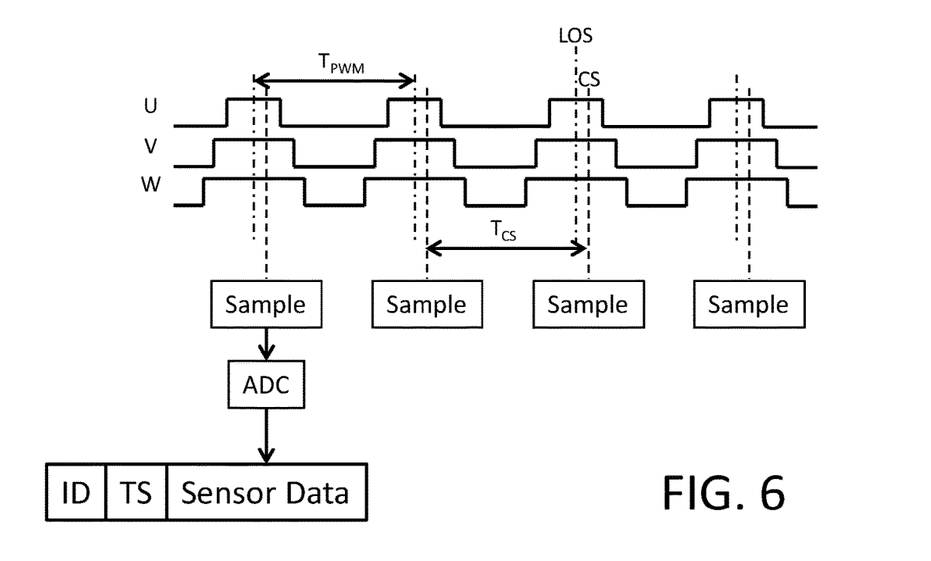
Figure 7:
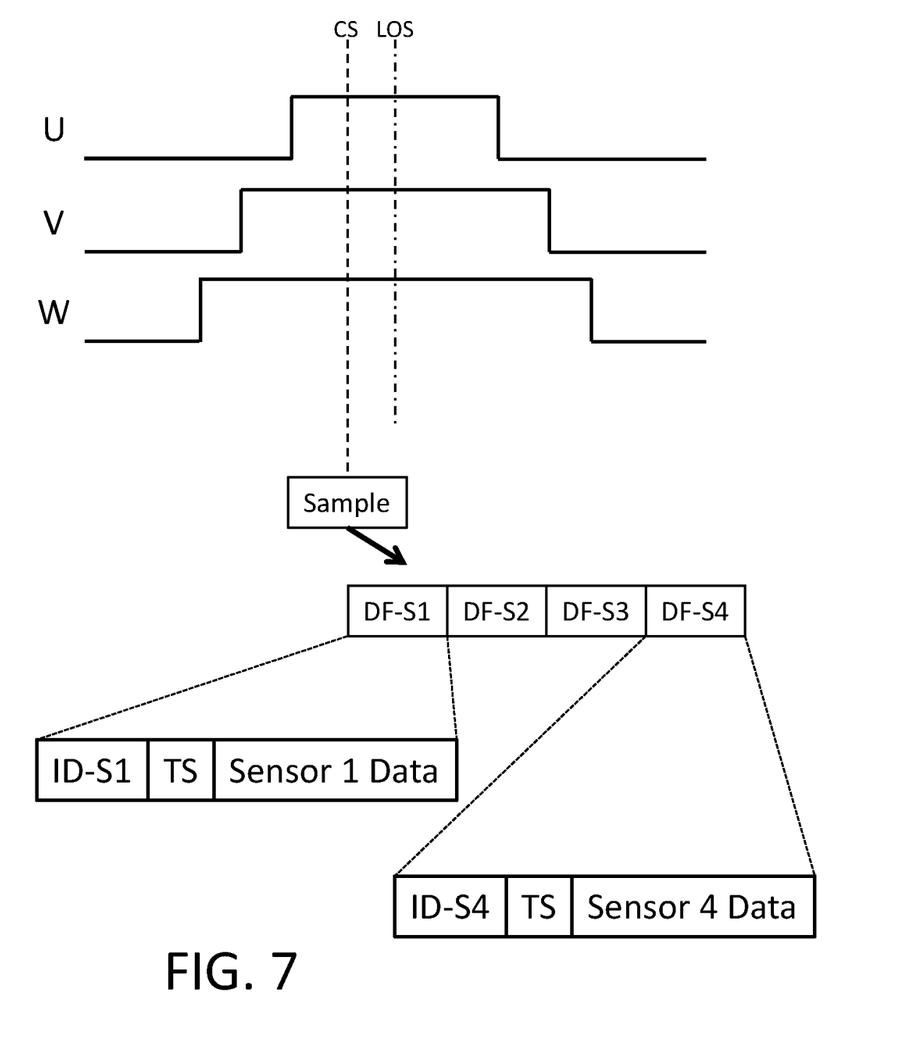
FIG. 7 shows the generation of data formats for plural sensors relative to the PWM control signaling and the sample and hold control signaling.

The sample and hold control signal CS is generated with a fixed timing relationship relative to the pulse line of symmetry (LOS). In an embodiment, that fixed timing relationship is offset in time from the pulse line of symmetry (LOS) by an offset ±Δt. The offset Δt may specify that the sample and hold control signal CS occur after the pulse line of symmetry (LOS), i.e., +Δt, or occur prior to the pulse line of symmetry (LOS), i.e., −Δt. Still further, the offset Δt may specify that the sample and hold control signal CS occur synchronous with the pulse line of symmetry (LOS), i.e., Δt=0. In any and all cases, however, the timing relationship between sample and hold control signal CS and the pulse line of symmetry (LOS) is fixed over many consecutive cycles of PWM control signal generation (see, FIG. 6). The PWM control signals have a frequency $f_{PWM}$ which sets the period $T_{PWM}$ and hence the time $T_{CS}$ between the occurrence of consecutive sample and hold control signals CS. At each instance of assertion of the sample and hold control signal CS, the information output from the MEMS sensor is sampled, and then provided for selection by the MUX and conversion by the analog to digital converter (ADC) for inclusion as the Sensor Data within the data format (DF) for the digital signal information processed by the control block. The data formats (DF) associated with MUX selected ones of the MEMS sensors are sequentially made available to the control block as shown in FIG. 7, with the first data field (ID) specifying the identification of the particular sensor (S1, S4, for example) and the third data field (Sensor Data) including the data from that particular sensor (Sensor 1 Data, Sensor 4 Data, for example). FIG. 7 further shows an example where the fixed timing relationship is such that the sample and hold control signal CS is generated prior to the pulse line of symmetry (LOS).

Figure 8:
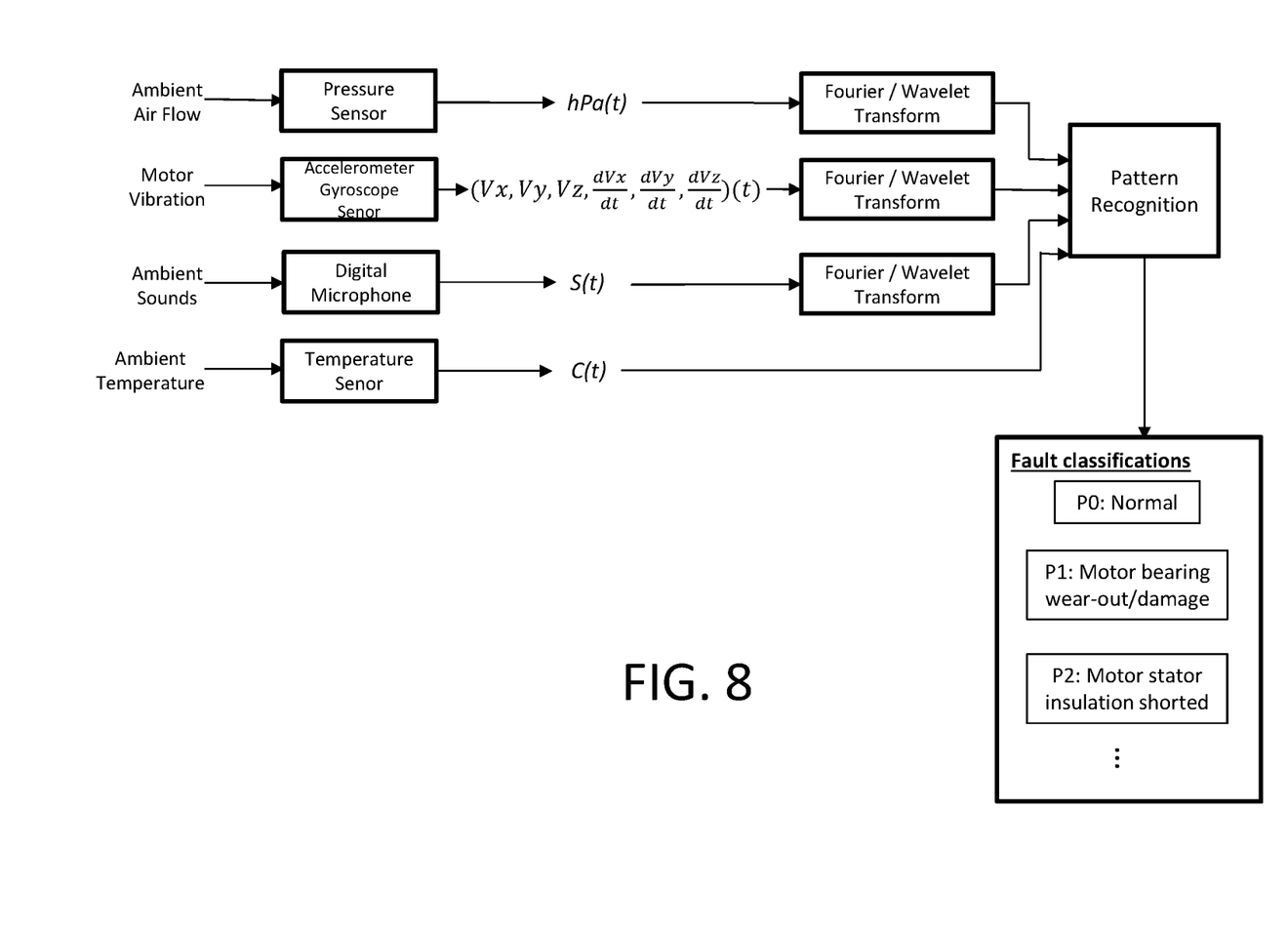
FIG. 8 shows the driver architecture for FIG. 3.

FIG. 8 shows the driver processing architecture. Motor operating condition information is collected through the MEMS sensors. That information, for example, includes non-motor winding data information on ambient air flow, motor vibration, ambient sounds and ambient temperature collected, for example, through the pressure sensor, accelerometer/gyroscope, microphone and temperature MEMS sensors. Some of the information, after conversion from analog to digital, may be processed by the control block using Fourier/wavelet transform techniques known to those skilled in the art to provide certain sensing information. That sensing information related to the non-motor winding data is then processed for pattern recognition to identify fault classifications with respect to motor operation such as: normal motor operation, motor bearing wear-out or damage; motor stator insulation shorted, etc. Because each piece of non-motor winding data (Sensor Data) comes with a sensor identification (ID) identifying the particular sensor generating the data and a timestamp (TS) identifying the particular point in time when the data was sampled, the driver processing architecture can ensure that desired pieces of data are being properly considered and fused. Identification and timestamp information further permits the driver processing architecture to accurately correlate and arrange data relating to a common MEMS source while further being able to evaluate change over time.

The pattern recognition operation may identify fault in response to one or more of the following pieces of non-motor winding data information:

in three-phase brushless direct current (BLDC) motor operation in normal mode the driven fan application usually carries constant and symmetrical load torque. There is no obvious torque transient while fan spins at a given RPM under normal condition;

when the motor performs well, the frequency response of air flow, vibration is closely correlated to motor speed (RPM). For a given motor RPM, the frequency signature/pattern is stable;

sound pitch changes can indicate certain motor faults (e.g. motor bearing fault);

frequency pattern changes with respect to certain sensed conditions may indicate failure/fault; and temperature measurement value or change in measured temperature can indicate failure/fault.

With respect to prior art solutions, on-line diagnosis is conventionally performed by an additional external module which does not receive motor status (e.g., motor speed/RPM, phase current) from the motor control system in real-time. Most diagnostic sensing signals are closely correlated to motor status. Various sensor selection and layout topologies in discrete solution (external sensors and motor driver) make it difficult to identify noise sourcing and sensor calibration during system design. A discrete on-line motor diagnostic solution is too expensive to be widely adopted by the industry. The designs are typically expensive to develop, occupy a large circuit area of the printed circuit board (PCB), and require complicated surrounding circuitry at additional cost.

The SiP solution described above, however, addresses the foregoing problems. The proposed integrated circuit architecture reduces power consumption, PCB footprint, and system design complicity, eases sensor calibration and improves noise immunity due to the "in-package" controlled condition. Motor status/feedbacks (RPM and current) are fully shared between motor control and diagnostic subsystems. This improves the diagnostic accuracy. It is well known that most sensing diagnostic signals are highly correlated to motor speed and status. All of the built-in sensors can be pre-calibrated. System calibration is minimized at application level. Sensing signal/noise ratio is increased due to the in-package controlled condition. Cross coherence among sensing signals is fully identified and the related impact on the early diagnosis is fully considered. The SiP technology seamlessly encloses multiple integrated circuits in a compact package and minimizes the power consumption.

Figure 9:
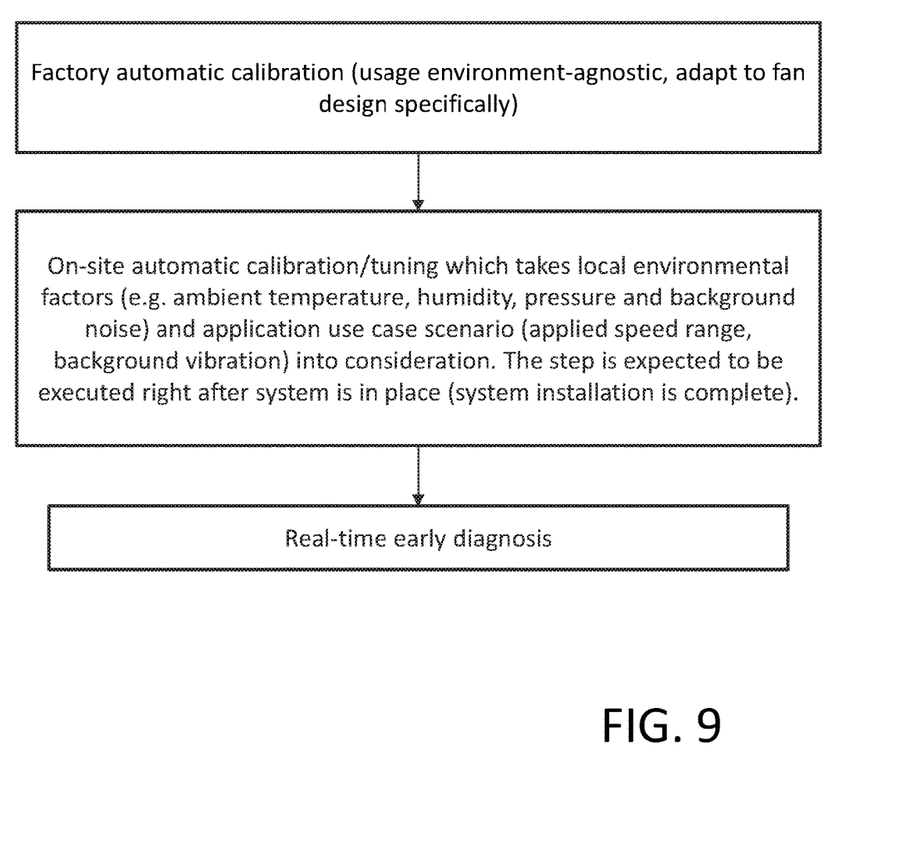
FIG. 9 is a flow diagram for a two-step calibration process.

Reference is now made to FIG. 9 showing a flow diagram for a two-step calibration process. In a first step, a factory automatic calibration is performed with respect to the motor (M) and its designed application (for example, as a fan motor). This calibration is agnostic to the ultimate usage environment. Instead, the calibration is adapted to the designed application. For a designed application as a fan motor, this calibration accordingly takes into account, for example, fan speed, fan size or more generally the physics of the fan such as torque, pressure and power. In a second step, an on-site automatic calibration is performed with respect to the installed motor application (i.e., installed as a fan motor). This calibration is sensitive to the usage environment and thus takes into account local environmental factors (such as ambient temperature, humidity, pressure, background noise, for example) and the application use case scenario (such as applied speed range and background vibration, for example). Performance of this second step calibration typically is made coincident in time with motor installation.

After the two step calibration is completed, a real-time early fault diagnosis process is performed using the information obtained from the two step calibration as well as non-motor winding data collected and processed during motor operation.

Figure 10:
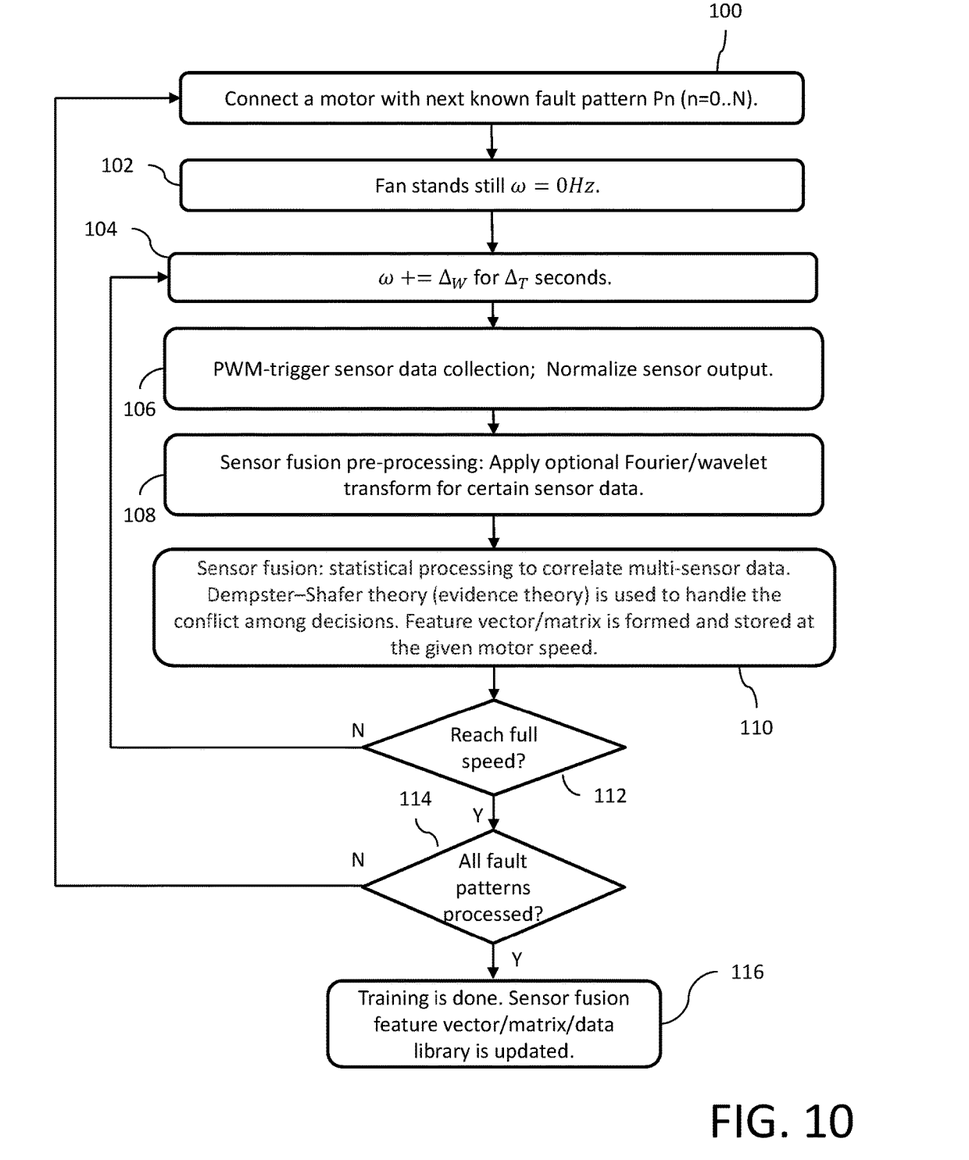
FIGS. 10 through 12 are flow diagrams for steps within the process of FIG. 9.

Reference is now made to FIG. 10 showing a flow diagram for the first step factory automatic calibration process of FIG. 9. In step 100, a motor having a known fault pattern Pn (n=0 . . . N) is connected in the designed application (for example, for the fan motor application. As an example, one fault pattern can relate to a first motor with a stator winding short circuit defect, and another fault pattern can related to a motor with bearing damage. The speed of the faulty motor is set at zero in step 102. Next, in step 104, the faulty motor speed is incremented by $\Delta_W$ for a duration of time $\Delta_T$. The sample and hold control signal CS triggers the collection of non-motor winding data information from the MEMS sensors in step 106. The sensor output information is normalized. Sensor data fusion preprocessing is performed in step 108. This may involve the optional application of Fourier/wavelet transform for certain sensor data (as desired/needed). Next, in step 110 sensor data fusion is performed. For example, statistical processing may be performed so as to correlate multi-sensor data. The Dempster-Shafer theory (evidence theory) may be used to handle conflict among decisions. As a result, a feature vector/matrix is formed and stored at the given motor speed relating to the specific known fault pattern. In step 112, a determination is made as to whether the faulty motor has reached full speed operation. If not, the process returns to step 104, the process is repeated and an additional feature vector/matrix is determined for the current motor speed and specific known fault pattern. If yes, then characterization of the faulty motor with the known fault pattern over a range of operating speeds is completed. A determination is then made in step 114 as to whether all known fault patterns have been processed. If not, the process returns to step 100 where a faulty motor with a different known fault pattern is connected in same the designed application. The process of FIG. 10 is the performed. Indeed the process is repeated as needed until all known fault patterns for the type of motor in the designed application have been evaluated across the entire speed range of the motor. At that point, as shown in step 116, training is completed and the sensor fusion feature vector/matrix/data library is updated with the results so as to produce a library of non-motor winding data information correlated to the known fault patterns.

Figure 11:
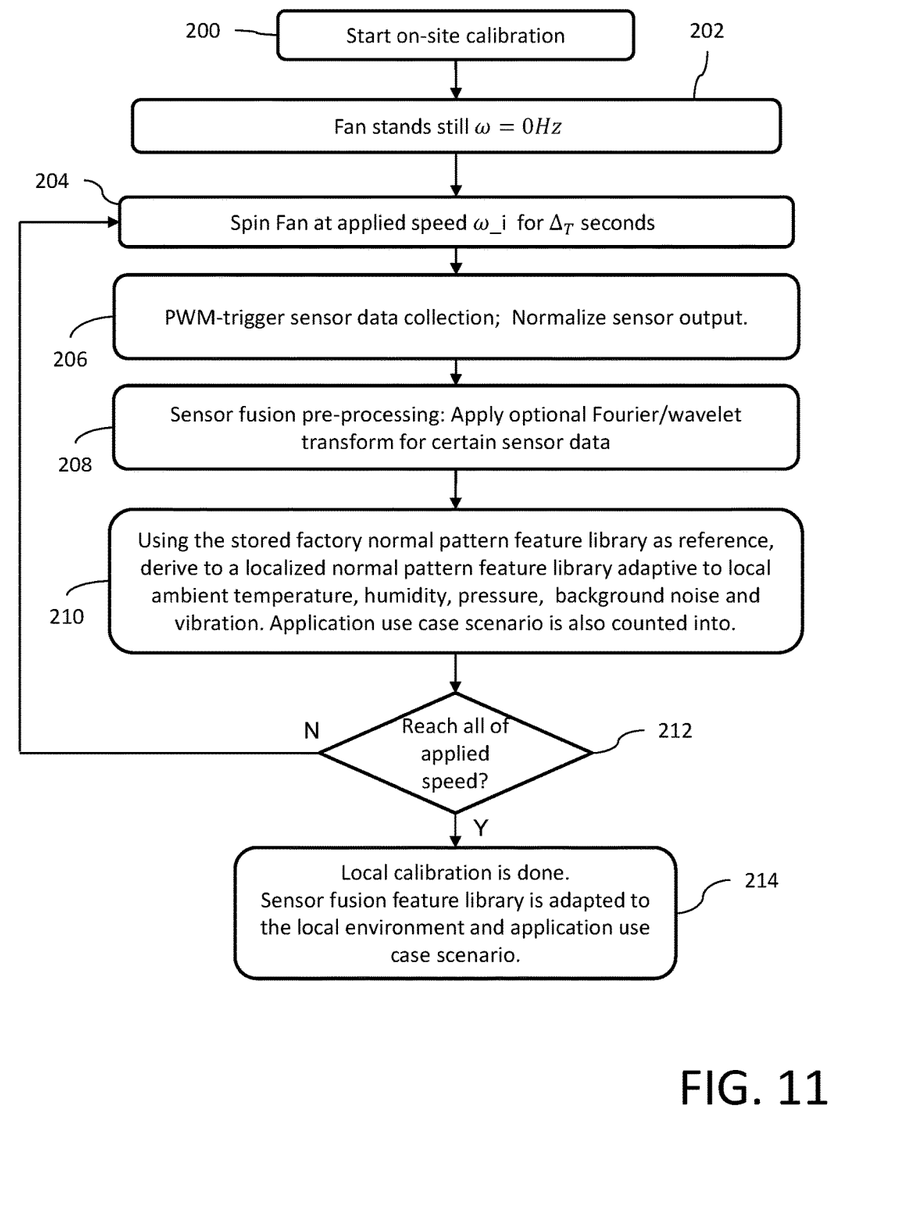

Reference is now made to FIG. 11 showing a flow diagram for the second step on-site automatic calibration process of FIG. 9. In step 200, the process is initiated following installation of the new (non-faulty) motor with the designed application at a site location. The motor is initially operated at a speed of zero in step 202. Then, the new motor is actuated (for example, to spin the fan) at an applied speed $\omega\_i$ for $\Delta_T$ seconds at step 204. The sample and hold control signal CS triggers the collection of non-motor winding data information from the MEMS sensors in step 206. The sensor output information is normalized. Sensor data fusion preprocessing is performed in step 208. This may involve the optional application of Fourier/wavelet transform for certain sensor data (as desired/needed). Next, in step 210 the sensor fusion feature vector/matrix/data library provides a normal factory pattern reference that is modified in response to the on-site sampled sensor information to derive a localized feature vector/matrix/data library adapted to the on-site usage environment (taking into account, for example, local ambient temperature, humidity, pressure, background noise and vibration). The application use case scenario is also taken into account. In step 212, a determination is made as to whether the new motor has been on-site calibrated across all applicable speeds. If not, the process returns to step 204 to select a different applied speed $\omega\_i$ and the process is repeated to further derive a localized feature vector/matrix/data library. If yes, then local on-site calibration is completed in step 214. The sensor fusion feature library is accordingly adapted to the local environment and application use case scenario and comprises a library of non-motor winding data information correlated to a non-faulty motor operation.

Figure 12:
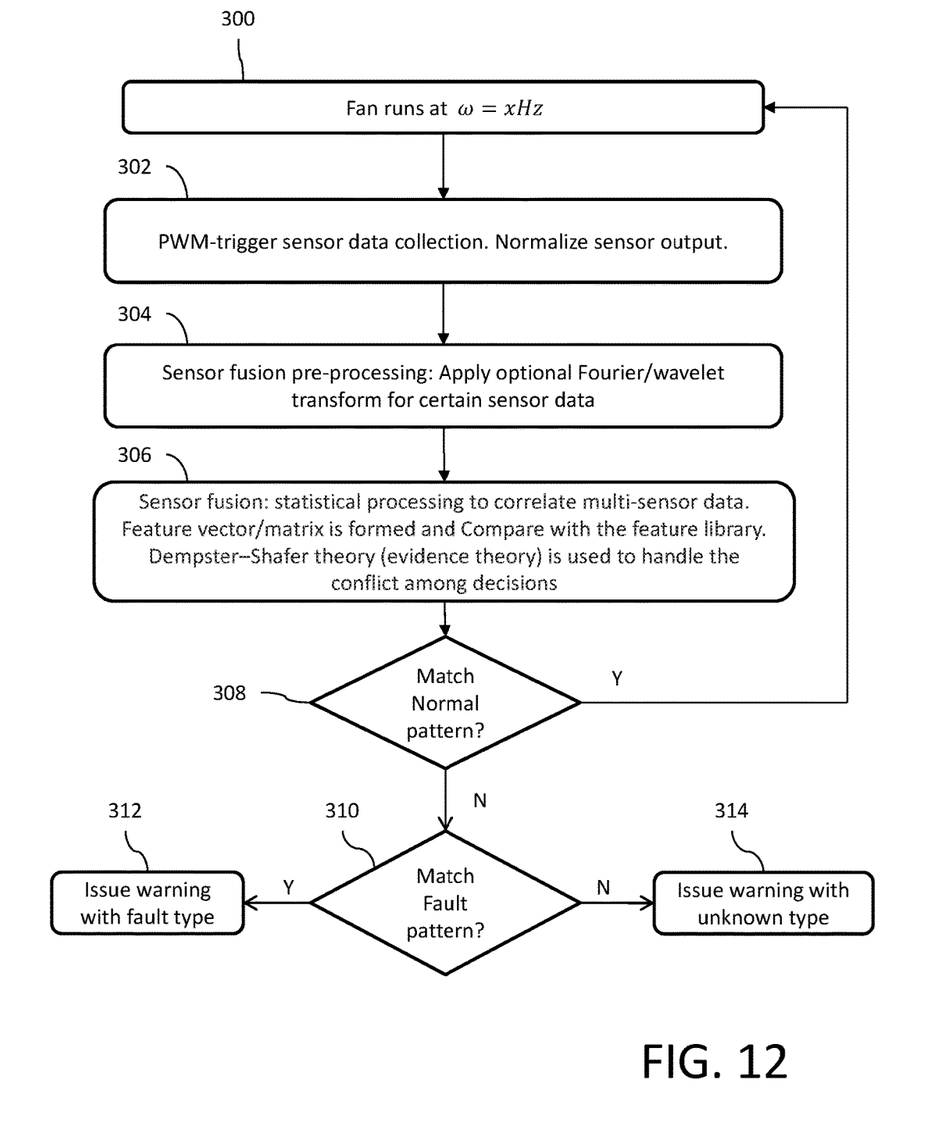

Reference is now made to FIG. 12 showing a flow diagram for the real-time early fault diagnosis process of FIG. 9. This process is performed while the motor is in operation for the designed application. In step 300, the motor is operating at a certain speed ($\omega$=xHz). The sample and hold control signal CS triggers the collection of information from the MEMS sensors in step 302. The sensor output information is normalized. Sensor data fusion preprocessing is performed in step 304. This may involve the optional application of Fourier/wavelet transform for certain sensor data (as desired/needed). Next, in step 306 sensor data fusion is performed. For example, statistical processing may be performed so as to correlate multi-sensor data. A feature vector/matrix is formed characterizing current motor operation and is then compared against the sensor fusion feature library that was adapted in FIG. 11 to the local environment and application use case scenario. The Dempster-Shafer theory (evidence theory) may be used to handle conflict among decisions. A determination is made in step 308 as to whether the feature vector/matrix for the current operation of the motor matches a normal pattern from the sensor fusion feature library from FIG. 11 that is indicative of normal operation of a non-faulty motor in the current environment. If yes, the process returns to step 300 to continue motor monitoring operations. In not, then a determination is made in step 310 as to whether the feature vector/matrix for the current operation of the motor matches a particular fault pattern for a faulty motor from the sensor fusion feature library as identified from FIG. 10. If yes, then a warning is issued in step 312 as to a fault corresponding to the matching fault pattern. If no, then a general warning is issued in step 314 as to the existence of an unknown type of fault.

Although the example discussed herein relates to an application of the motor to drive a fan, it will be understood that this is just one example of the application and use of the process herein. Other applications could, for example, include operation to drive a pump or a haptic feedback system. In each case, the sensor fusion feature library from FIG. 11 that is indicative of normal operation of a non-faulty motor in the current environment, as well as feature vector/matrix for a particular fault pattern as identified from FIG. 10 for a faulty motor, would be tailored to the given application.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:
1. A system in package (SiP), comprising:
at least one integrated circuit die implementing a micro-electro-mechanical-systems (MEMS) sensor;
at least one integrated circuit die implementing a control circuit for a motor;
a support substrate having a top surface and a bottom surface, with first pads on the top surface and second pads on the bottom surface, the first and second pads interconnected by interconnect wiring;
wherein the at least one integrated circuit die implementing the MEMS sensor is mounted to the top surface and electrically connected to ones of said first pads;
wherein the at least one integrated circuit die implementing the control circuit for the motor body is also mounted to the top surface and electrically connected to other ones of said first pads; and
an encapsulant body which encapsulates the at least one integrated circuit die implementing the MEMS sensor and the at least one integrated circuit die implementing the control circuit for the motor.

2. The SiP of claim 1, further comprising bonding wires for electrically connecting the at least one integrated circuit die implementing the MEMS sensor and the at least one integrated circuit die implementing the control circuit for the motor to said first pads.

3. The SiP of claim 1, wherein the at least one integrated circuit die implementing the MEMS sensor and the at least one integrated circuit die implementing the control circuit for the motor are mounted in flip-chip configuration to said first pads.

4. The SiP of claim 1, further comprising interconnection wiring supported by the support substrate for interconnecting the at least one integrated circuit die implementing the MEMS sensor to the at least one integrated circuit die implementing the control circuit for the motor.

5. The SiP of claim 1, wherein the control circuit for the motor is a three-phase motor driver circuit.

6. The SiP of claim 5, wherein the three-phase motor driver circuit generates pulse width modulation (PWM) control signals.

7. The SiP of claim 6, wherein the MEMS sensor includes a sample and hold circuit, and wherein the sample and hold circuit is configured to perform a sampling operation in response to a control signal, and wherein said control signal is generated with a fixed timing relationship relative to the PWM control signals.

8. The SiP of claim 6, wherein the MEMS sensor includes a sample and hold circuit, and wherein the sample and hold circuit is configured to perform a sampling operation in response to a control signal, wherein the PWM control signals comprise pulses sharing a common pulse line of symmetry, and wherein said control signal is generated with a fixed timing relationship relative to the common pulse line of symmetry for the PWM control signals.

9. The SiP of claim 1, wherein the control circuit operates to control motor operation and further process non-motor winding data information output from the MEMS sensor to detect motor operating problems.

10. The SiP of claim 1, wherein the control circuit processes non-motor winding data information output from the MEMS sensor in comparison to normal operation feature information to detect instances of abnormal motor operation.

11. The SiP of claim 10, wherein the normal operation feature information is generated in connection with motor operation during an on-site calibration operation.

12. The SiP of claim 1, wherein the control circuit processes non-motor winding data information output from the MEMS sensor in comparison to fault operation feature information to detect instances of motor fault.

13. The SiP of claim 12, wherein the fault operation feature information is generated in connection with operation of motors with a variety of known fault patterns during a factory calibration operation.

14. A method, comprising:
operating a plurality of faulty motors having different known fault patterns over a range of motor operating speeds;
sensing non-motor winding data information relating to each of the plurality of faulty motors using one or more micro-electro-mechanical-systems (MEMS) sensors; and
processing the non-motor winding data information to generate a library of non-motor winding data information correlated to the known fault patterns.

15. The method of claim 14, wherein operating the plurality of faulty motors comprises:
generating pulse width modulation (PWM) control signals for application to the plurality of faulty motors; and
sampling the non-motor winding data information generated by the MEMS sensors at sample times that have a fixed timing relationship relative to the PWM control signals.

16. The method of claim 15, wherein the PWM control signals comprise pulses sharing a common pulse line of symmetry, and said sample times have a fixed timing relationship relative to the common pulse line of symmetry for the PWM control signals.

17. The method of claim 14, further comprising:
operating an application motor that does not have a fault pattern over a range of motor operating speeds;
sensing non-motor winding data information relating to the application motor using said one or more MEMS sensors; and
processing the non-motor winding data information to generate a library of non-motor winding data information correlated to non-faulty motor operation.

18. The method of claim 17, wherein operating the application motor comprises:
generating pulse width modulation (PWM) control signals for application to the application motor; and
sampling the non-motor winding data information generated by the MEMS sensors at sample times that have a fixed timing relationship relative to the PWM control signals.

19. The method of claim 18, wherein the PWM control signals comprise pulses sharing a common pulse line of symmetry, and said sample times have a fixed timing relationship relative to the common pulse line of symmetry for the PWM control signals.

20. The method of claim 17, further comprising
operating the application motor over time;
sensing non-motor winding data information relating to the application motor using said one or more MEMS sensors;
comparing the sensed non-motor winding data information to the library of non-motor winding data information correlated to non-faulty motor operation; and
if there is a match between the sensed non-motor winding data information to the library of non-motor winding data information correlated to non-faulty motor operation, then continuing operation of the application motor.

21. The method of claim 20, further comprising:
if there is not a match between the sensed non-motor winding data information to the library of non-motor winding data information correlated to non-faulty motor operation, then comparing the sensed non-motor winding data information to the library of non-motor winding data information correlated to the known fault patterns; and if there is a match between the sensed non-motor winding data information to the library of non-motor winding data information correlated to the known fault patterns, then issuing a fault warning for the known fault pattern that matches.

22. The method of claim 20, further comprising:

if there is not a match between the sensed non-motor winding data information to the library of non-motor winding data information correlated to non-fault motor operation, then issuing a warning as to possible motor fault.

23. The method of claim 20, wherein operating the application motor comprises:

generating pulse width modulation (PWM) control signals for application to the application motor; and sampling the non-motor winding data information generated by the MEMS sensors at sample times that have a fixed timing relationship relative to the PWM control signals.

24. The method of claim 23, wherein the PWM control signals comprise pulses sharing a common pulse line of symmetry, and said sample times have a fixed timing relationship relative to the common pulse line of symmetry for the PWM control signals.

25. A system, comprising:

a micro-electro-mechanical-systems (MEMS) sensor; and a control circuit for a motor configured to generate PWM control signals;

wherein the MEMS sensor includes a sample and hold circuit, wherein the sample and hold circuit is configured to perform a sampling operation on information output from the MEMS sensor in response to a control signal, and wherein said control signal is generated by the control circuit with a fixed timing relationship relative to the PWM control signals.

26. The system of claim 25, wherein the PWM control signals comprise pulses sharing a common pulse line of symmetry, and wherein said control signal is generated with a fixed timing relationship relative to the common pulse line of symmetry for the PWM control signals.

27. The system of claim 25, wherein the control circuit operates to control motor operation and further process non-motor winding data information output from the MEMS sensor to detect motor operating problems.

28. The system of claim 25, wherein the control circuit processes non-motor winding data information output from the MEMS sensor in comparison to normal operation feature information to detect instances of abnormal motor operation.

29. The system of claim 28, wherein the normal operation feature information is generated in connection with motor operation during an on-site calibration operation.

30. The system of claim 25, wherein the control circuit processes non-motor winding data information output from the MEMS sensor in comparison to fault operation feature information to detect instances of motor fault.

31. The system of claim 30, wherein the fault operation feature information is generated in connection with operation of motors with a variety of known fault patterns during a factory calibration operation.

* * * * *